Patented June 18, 1929.

1,717,960

UNITED STATES PATENT OFFICE.

ALFRED CLAUS, OF BROOKLYN, NEW YORK.

COMPOSITION FOR CUTTING EDGES OF SAFETY-RAZOR BLADES.

No Drawing.     Application filed July 22, 1924. Serial No. 727,544.

This invention has for one of its objects, the provision of a composition of matter especially adapted to prevent the corrosion of the cutting edge of a safety razor blade and the accumulation of dust and other foreign matter in the interstices of the cutting edge of the blade.

The composition consists of the following ingredients, combined in the proportions stated, viz:

Refined mutton tallow 80 parts,
White beeswax 20 parts.

The beeswax is heated to the melting point in any suitable receptacle and while in a melted state the mutton tallow is slowly added. The mass is stirred until the constituents thereof are thoroughly mingled, and while this is being done the beeswax and tallow are maintained in a melted state. After the constituents have been thoroughly mingled, the mass is poured in molds each of which preferably consists of an open ended tube one inch in diameter and closed at one end by a cork. After the mass has cooled, it is removed from the mold by forcing the cork through the mold by means of a rod or other suitable implement. The stick thus formed is then cut into units approximately three quarters of an inch in length. The units are wrapped in tin-foil which is secured against displacement preferably by a label, and the composition is now ready for the market.

In practice the composition is applied by rubbing it across the cutting edge of the blade, and due to the shape of the package in which the composition is sold this may be readily done without danger of cutting the fingers. The composition adheres to the cutting edge of the blade and forms a protective coating about the same. This protective coating will due to the preponderance of tallow therein prevent the cutting edge of the blade from corroding and will prevent the accumulation of dust and other fine matter in the interstices of the cutting edge, and it may be readily removed when it is desired to use the blade.

It has been found by experimentation that the relative proportions of the ingredients makes the most satisfactory compound. The beeswax is added to the tallow to raise the melting point of the composition, and it has been found that the proportions of the ingredients stated will maintain the composition on the razor blade in the hottest summer day without melting, and at the same time the composition is readily removed from the razor blade by subjecting the blade to the action of hot water at substantially boiling point.

In practice it has been found that the cutting edge of a safety razor blade protected by the composition will, without being honed or stropped, remain sharp for a comparatively long time.

What is claimed is:—

A composition of matter for treating the edges of razor and other blades by rubbing it thereon, comprising mutton tallow, eighty parts, and white beeswax, twenty parts, said ingredients being thoroughly mingled while in melted condition and formed in a stick for application.

In testimony whereof I affix my signature.

ALFRED CLAUS.